United States Patent
Bisaga

(10) Patent No.: US 9,911,001 B2
(45) Date of Patent: Mar. 6, 2018

(54) AUTOMATIC SQL QUERY MODIFICATION FOR DATA RESTRICTION

(71) Applicant: Pearson Education, Inc., New York, NY (US)

(72) Inventor: Gary J. Bisaga, Leesburg, VA (US)

(73) Assignee: PEARSON EDUCATION, INC., New York, NY (US)

( * ) Notice: Subject to any disclaimer, the term of this patent is extended or adjusted under 35 U.S.C. 154(b) by 340 days.

(21) Appl. No.: 14/738,539

(22) Filed: Jun. 12, 2015

(65) Prior Publication Data
US 2016/0364444 A1    Dec. 15, 2016

(51) Int. Cl.
H04L 29/06    (2006.01)
G06F 21/62    (2013.01)
G06F 17/30    (2006.01)

(52) U.S. Cl.
CPC .......... *G06F 21/6227* (2013.01); *G06F 21/62* (2013.01); *G06F 17/30427* (2013.01)

(58) Field of Classification Search
CPC .............................. G06F 21/62; G06F 21/6227
See application file for complete search history.

(56) References Cited

U.S. PATENT DOCUMENTS

| 9,015,187 B1* | 4/2015 | Shatdal | G06F 17/30103 707/769 |
| 9,607,099 B2* | 3/2017 | Dettinger | G06F 17/3097 |
| 2008/0288465 A1* | 11/2008 | Payton | G06F 17/30398 |
| 2011/0302551 A1* | 12/2011 | Hummel, Jr. | G06Q 10/06 717/105 |
| 2012/0330925 A1* | 12/2012 | Ramamurthy | G06F 17/30448 707/718 |
| 2013/0018898 A1* | 1/2013 | Forstmann | G06F 17/30979 707/752 |
| 2014/0052749 A1* | 2/2014 | Rissanen | G06F 21/6227 707/759 |
| 2014/0317084 A1* | 10/2014 | Chaudhry | G06F 17/30457 707/713 |
| 2015/0019216 A1* | 1/2015 | Singh | G10L 15/183 704/235 |
| 2015/0067640 A1* | 3/2015 | Booker | G06F 8/33 717/109 |

(Continued)

OTHER PUBLICATIONS

Andreas Behm, Returning Modified Rows—SELECT Statements with Side Effects, Aug. 31-Sep. 3, 2004, ACM, vol. 30, pp. 987-997.*

(Continued)

*Primary Examiner* — Luu Pham
*Assistant Examiner* — Fahimeh Mohammadi
(74) *Attorney, Agent, or Firm* — Kilpatrick Townsend & Stockton LLP

(57) ABSTRACT

A method of automatically modifying a computer data query is disclosed herein. The modification of the computer data query can be performed to restrict access to data. The computer data query can be modified by receiving the computer data query, identifying tables in the query and retrieving providers associated with the tables identified in the query. These providers can be linked to one or several predicates. These predicates can be retrieved and used to modify the query. The modified query can then be used to retrieve data from one or several tables identified within the query.

18 Claims, 10 Drawing Sheets

(56) References Cited

U.S. PATENT DOCUMENTS

2015/0127599 A1* 5/2015 Schiebeler ........ G06F 17/30377
707/602
2015/0324383 A1* 11/2015 Goyal ............... G06F 17/30864
707/713

OTHER PUBLICATIONS

R.F. Boyc et al., Specifying Queries as Relational Expressions, Nov. 4-6, 1973, ACCM, vol. 9 Issue 3, pp. 31-47.*
P. Griffiths Selinger et al., Access Path Selection in a Relational Database Management System, May 30-Jun. 1, 1979, ACM, pp. 23-34.*
Chun Zhang et al., On Supporting Containment Queries in Relational Database Management System, Jun. 2001, vol. 30 Issue 2, pp. 425-436.*

* cited by examiner

AUTOMATIC SQL QUERY MODIFICATION FOR DATA RESTRICTION

BACKGROUND OF THE INVENTION

This disclosure relates in general to a content distribution network configured for automated query modification. Data management and/or security are increasingly of greater importance. In fact, accessing and stealing personal data contained within institutional computing systems can be lucrative for hackers and damaging for the victims of this crime. To protect their citizens, governments around the world are slowly increasing the regulatory burdens and obligations on companies who use and/or maintain personal data. While these regulatory burdens and obligations have good intentions, it is becoming increasingly clear that such regulations do not solve the data privacy issues.

The problems of data security have only become more pronounced in the last couple years with the increase in cloud computing and the increase in the demand for third party software to access content distribution networks. This shift towards cloud computing and third party software has become particularly problematic apparent in the fields of education and healthcare. In light of these problems, further developments in the realm of data privacy are desired.

BRIEF SUMMARY OF THE INVENTION

One aspect of the present disclosure relates to systems and methods for automatic modification of a query. This query can be a character string that: identifies one or several databases, also referred to herein as tables; identifies some or all of the content within the one or several tables; and specifies an action. The query can be in a computer programming language such as, for example, Structured Query Language (SQL). The query can be received by a processor from a user device, which processor can parse the query. The processor can additionally receive information identifying the user and/or runtime conditions from the user device and can use this information, in addition to information from the query to identify one or several predicates. These one or several predicates can be character strings in the same computer programming language as the query and the predicates can be insertable into the query to modify the scope of the query to thereby limit data accessed by the query to data that is designated as accessible by the user. The query can then be modified by the one or several predicates, and the modified query can then be used to access the tables.

One aspect of the present disclosure relate to a method for managing access to information via the automated modification of a request for information. The method includes receiving a query from a user device, which query includes a character string arranged according to a programming language, which query identifies a first table having a row and a column, and which query identifies at least one of the row; and column for data retrieval. The method can include receiving user attribute information relating to a user of the user device, which user attribute information identifies a categorization of the user, parsing the query with a programming language parser, retrieving an access rule corresponding to the first table in the query and the user attribute information, and editing the query based on the access rule by modifying a portion of the character string.

In some embodiments of the method, the query can be a named query, and in some embodiments of the method, the query can be a table query. In some embodiments of the method, parsing the query with a programming language parser includes building an abstract syntax tree representing the query. In some embodiments of the method, retrieving the access rule corresponding to the first table in the query and the user attribute information includes determining if the first table is identified in the query. In some embodiments of the method, the access rule corresponding to the first table in the query and the user attribute information is retrieved if the first table is identified in the query.

In some embodiments of the method, retrieving the access rule corresponding to the first table in the query and the user attribute information can include: retrieving data associated with the first table in the query, determining if a provider is identified in the data associated with the first table in the query, and selecting the identified provider if the provider is identified in the data associated with the first table in the query. In some embodiments of the method, retrieving the access rule corresponding to the first table in the query and the user attribute information includes retrieving a predicate associated with the provider, which predicate can include a pre-created text string insertable into a query to modify the scope of the query.

In some embodiments of the method, retrieving the access rule corresponding to the first table in the query and the user attribute information can include: determining if an additional provider is associated with the first table, retrieving the additional provider associated with the first table, and retrieving a predicate associated with the additional provider associated with the first table. In some embodiments, the method can include determining if a second table is associated with the query, identifying a provider associated with the second table, and retrieving a predicate associated with the second table. In some embodiments the method can include stacking the predicates associated with the first table and the predicates associated with the second table. In some embodiments of the method, editing the query based on the access rule by modifying a portion of the character string can include inserting the stacked predicates associated with the first table and the predicates associated with the second table into the text character string of the query.

One aspect of the present disclosure relates to a system for managing access to information via the automated modification of a request for information. The system includes a memory including: a database including data arranged in a plurality of tables, a table database containing information relating to one or several tables, and a provider database including at least one group of access rules specifying the accessibility of the data arranged in the plurality of tables by one or several categorizations of users. The system can include a processor controllable by computer code to receive a query from a user device, which query includes a character string arranged according to a programming language, which query identifies a first table including a row and a column, which first table is one of the plurality of tables of the database, and which query identifies at least one of: the row, and column, for data retrieval. The processor can be controllable by computer code to receive user attribute information relating to a user of the user device, which user attribute information identifies a categorization of the user, parse the query with a programming language parser, retrieve an access rule corresponding to the first table in the query and the user attribute information, and edit the query based on the access rule by modifying a portion of the character string.

In some embodiments of the system, parsing the query with a programming language parser includes building an abstract syntax tree representing the query. In some aspects of the system, retrieving the access rule corresponding to the first table in the query and the user attribute information includes determining if the first table is identified in the query. In some aspects of the system, the access rule corresponding to the first table in the query and the user attribute information is retrieved if the first table is identified in the query.

In some embodiments, retrieving the access rule corresponding to the first table in the query and the user attribute information includes: retrieving data associated with the first table in the query, determining if a provider is identified in the data associated with the first table in the query, and selecting the identified provider if the provider is identified in the data associated with the first table in the query. In some aspects of the system, retrieving the access rule corresponding to the first table in the query and the user attribute information includes retrieving a predicate associated with the provider, which predicate includes a pre-created text string insertable into a query to modify the scope of the query.

In some aspects of the system, retrieving the access rule corresponding to the first table in the query and the user attribute information includes: determining if an additional provider is associated with the first table, retrieving the additional provider associated with the first table, and retrieving a predicate associated with the additional provider associated with the first table. In some aspects of the system, the processor can be controllable by computer code to: determine if a second table is associated with the query, identify a provider associated with the second table, and retrieve a predicate associated with the second table. In some aspects of the system, the processor can be controllable by computer code to stack the predicates associated with the first table and the predicates associated with the second table. In some embodiments of the system, editing the query based on the access rule by modifying a portion of the character string includes inserting the stacked predicates associated with the first table and the predicates associated with the second table into the text character string of the query.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Where the reference label is used in the specification, the description is applicable to any one of the similar components having the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

The ensuing description provides illustrative embodiment(s) only and is not intended to limit the scope, applicability or configuration of the disclosure. Rather, the ensuing description of the illustrative embodiment(s) will provide those skilled in the art with an enabling description for implementing a preferred exemplary embodiment. It is understood that various changes can be made in the function and arrangement of elements without departing from the spirit and scope as set forth in the appended claims.

Figure 1:
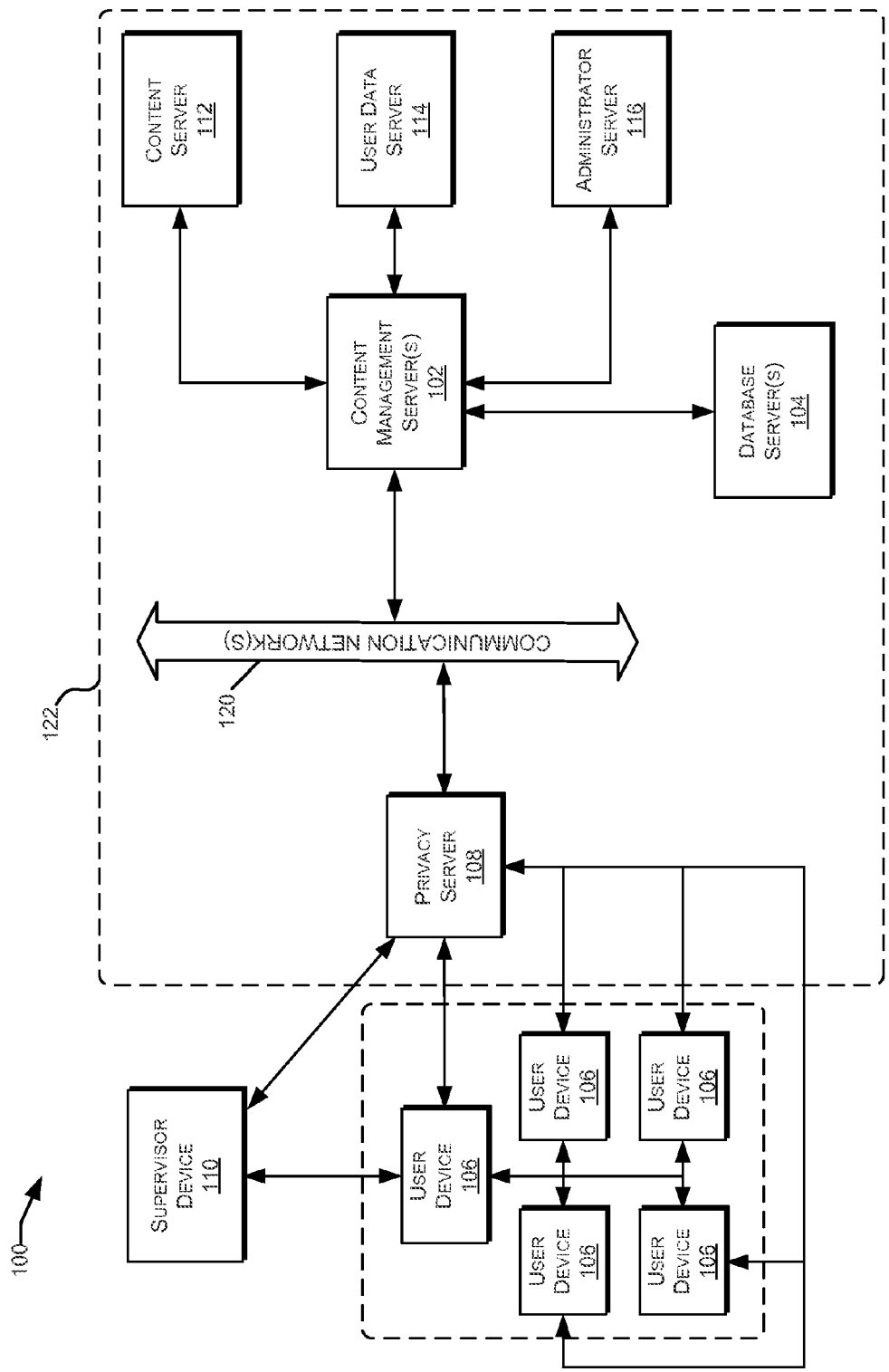
FIG. 1 is a block diagram showing illustrating an example of a content distribution network.

With reference now to FIG. 1, a block diagram is shown illustrating various components of a content distribution network 100 which implements and supports certain embodiments and features described herein. Content distribution network 100 may include one or more content management servers 102. As discussed below in more detail, content management servers 102 may be any desired type of server including, for example, a rack server, a tower server, a miniature server, a blade server, a mini rack server, a mobile server, an ultra-dense server, a super server, or the like, and may include various hardware components, for example, a motherboard, a processing units, memory systems, hard drives, network interfaces, power supplies, etc. Content management server 102 may include one or more server farms, clusters, or any other appropriate arrangement and/or combination or computer servers. Content management server 102 may act according to stored instructions located in a memory subsystem of the server 102, and may run an operating system, including any commercially available server operating system and/or any other operating systems discussed herein.

The content distribution network 100 may include one or more databases servers 104, also referred to herein as databases. The database servers 104 can access data that can be stored on a variety of hardware components. These hardware components can include, for example, components forming tier 0 storage, components forming tier 1 storage, components forming tier 2 storage, and/or any other tier of storage. In some embodiments, tier 0 storage refers to storage that is the fastest tier of storage in the database server 104, and particularly, the tier 0 storage is the fastest storage that is not RAM or cache memory. In some embodiments, the tier 0 memory can be embodied in solid state memory such as, for example, a solid-state drive (SSD) and/or flash memory.

In some embodiments, the tier 1 storage refers to storage that is one or several higher performing systems in the memory management system, and that is relatively slower than tier 0 memory, and relatively faster than other tiers of memory. The tier 1 memory can be one or several hard disks that can be, for example, high-performance hard disks. These hard disks can be one or both of physically or communicatingly connected such as, for example, by one or several fiber channels. In some embodiments, the one or several disks can be arranged into a disk storage system, and specifically can be arranged into an enterprise class disk storage system. The disk storage system can include any desired level of redundancy to protect data stored therein, and in one embodiment, the disk storage system can be made with grid architecture that creates parallelism for uniform allocation of system resources and balanced data distribution.

In some embodiments, the tier 2 storage refers to storage that includes one or several relatively lower performing systems in the memory management system, as compared to the tier 1 and tier 2 storages. Thus, tier 2 memory is relatively slower than tier 1 and tier 0 memories. Tier 2 memory can include one or several SATA-drives or one or several NL-SATA drives.

In some embodiments, the one or several hardware and/or software components of the database server 104 can be arranged into one or several storage area networks (SAN), which one or several storage area networks can be one or several dedicated networks that provide access to data storage, and particularly that provides access to consolidated, block level data storage. A SAN typically has its own network of storage devices that are generally not accessible through the local area network (LAN) by other devices. The SAN allows access to these devices in a manner such that these devices appear to be locally attached to the user device.

Databases 104 may comprise stored data relevant to the functions of the content distribution network 100. Illustrative examples of databases 104 that may be maintained in certain embodiments of the content distribution network 100 are described below in reference to FIG. 3. In some embodiments, multiple databases may reside on a single database server 104, either using the same storage components of server 104 or using different physical storage components to assure data security and integrity between databases. In other embodiments, each database may have a separate dedicated database server 104.

The content distribution network 100 also may include one or more user devices 106 and/or supervisor devices 110. User devices 106 and supervisor devices 110 may display content received via the content distribution network 100, and may support various types of user interactions with the content. In some embodiments, the user devices 106 and the supervisor devices 110 can be configured to access data in, edit data in, retrieve data from, and/or provide data to the content distribution network.

User devices 106 and supervisor devices 110 may include mobile devices such as smartphones, tablet computers, personal digital assistants, and wearable computing devices. Such mobile devices may run a variety of mobile operating systems, and may be enabled for Internet, e-mail, short message service (SMS), Bluetooth®, mobile radio-frequency identification (M-RFID), and/or other communication protocols. Other user devices 106 and supervisor devices 110 may be general purpose personal computers or special-purpose computing devices including, by way of example, personal computers, laptop computers, workstation computers, projection devices, and interactive room display systems. Additionally, user devices 106 and supervisor devices 110 may be any other electronic devices, such as thin-client computers, Internet-enabled gaming system, business or home appliances, and/or personal messaging devices, capable of communicating over network(s) 120. In some embodiments, the designated role of a device, including a user device 106 or a supervisor device 110 can vary based on the identity of the user using that device. Thus, in some embodiments, both user and supervisor devices 106, 110 can include the same hardware, but can be configured as one of a user device 106 or a supervisor device 110 at the time of log-in by a user to use that device.

In different contexts of content distribution networks 100, user devices 106 and supervisor devices 110 may correspond to different types of specialized devices, for example, student devices and teacher devices in an educational network, employee devices and presentation devices in a company network, different gaming devices in a gaming network, etc. In some embodiments, user devices 106 and supervisor devices 110 may operate in the same physical location 107, such as a classroom or conference room. In such cases, the devices may contain components that support direct communications with other nearby devices, such as a wireless transceivers and wireless communications interfaces, Ethernet sockets or other Local Area Network (LAN) interfaces, etc. In other implementations, the user devices 106 and supervisor devices 110 need not be used at the same location 107, but may be used in remote geographic locations in which each user device 106 and supervisor device 110 may use security features and/or specialized hardware (e.g., hardware-accelerated SSL and HTTPS, WS-Security, firewalls, etc.) to communicate with the content management server 102 and/or other remotely located user devices 106. Additionally, different user devices 106 and supervisor devices 110 may be assigned different designated roles, such as presenter devices, teacher devices, administrator devices, or the like, and in such cases the different devices may be provided with additional hardware and/or software components to provide content and support user capabilities not available to the other devices.

The content distribution network 100 also may include a privacy server 108 that maintains private user information at the privacy server 108 while using applications or services hosted on other servers. For example, the privacy server 108 may be used to maintain private data of a user within one jurisdiction even though the user is accessing an application hosted on a server (e.g., the content management server 102) located outside the jurisdiction. In such cases, the privacy server 108 may intercept communications between a user device 106 or supervisor device 110 and other devices that include private user information. The privacy server 108 may create a token or identifier that does not disclose the private information and may use the token or identifier when communicating with the other servers and systems, instead of using the user's private information.

As illustrated in FIG. 1, the content management server 102 may be in communication with one or more additional servers, such as a content server 112, a user data server 112, and/or an administrator server 116. Each of these servers may include some or all of the same physical and logical components as the content management server(s) 102, and in some cases, the hardware and software components of these servers 112-116 may be incorporated into the content management server(s) 102, rather than being implemented as separate computer servers.

Content server 112 may include hardware and software components to generate, store, and maintain the content resources for distribution to user devices 106 and other devices in the network 100. For example, in content distribution networks 100 used for professional training and educational purposes, content server 112 may include databases of training materials, presentations, interactive programs and simulations, course models, course outlines, and various training interfaces that correspond to different materials and/or different types of user devices 106. In content distribution networks 100 used for media distribution, interactive gaming, and the like, a content server 112 may include media content files such as music, movies, television programming, games, and advertisements.

User data server 114 may include hardware and software components that store and process data for multiple users relating to each user's activities and usage of the content distribution network 100. For example, the content management server 102 may record and track each user's system usage, including their user device 106, content resources accessed, and interactions with other user devices 106. This data may be stored and processed by the user data server 114, to support user tracking and analysis features. For instance, in the professional training and educational contexts, the user data server 114 may store and analyze each user's training materials viewed, presentations attended, courses completed, interactions, evaluation results, and the like. The user data server 114 may also include a repository for user-generated material, such as evaluations and tests completed by users, and documents and assignments prepared by users. In the context of media distribution and interactive gaming, the user data server 114 may store and process resource access data for multiple users (e.g., content titles accessed, access times, data usage amounts, gaming histories, user devices and device types, etc.).

Administrator server 116 may include hardware and software components to initiate various administrative functions at the content management server 102 and other components within the content distribution network 100. For example, the administrator server 116 may monitor device status and performance for the various servers, databases, and/or user devices 106 in the content distribution network 100. When necessary, the administrator server 116 may add or remove devices from the network 100, and perform device maintenance such as providing software updates to the devices in the network 100. Various administrative tools on the administrator server 116 may allow authorized users to set user access permissions to various content resources, monitor resource usage by users and devices 106, and perform analyses and generate reports on specific network users and/or devices (e.g., resource usage tracking reports, training evaluations, etc.).

The content distribution network 100 may include one or more communication networks 120. Although only a single network 120 is identified in FIG. 1, the content distribution network 100 may include any number of different communication networks between any of the computer servers and devices shown in FIG. 1 and/or other devices described herein. Communication networks 120 may enable communication between the various computing devices, servers, and other components of the content distribution network 100. As discussed below, various implementations of content distribution networks 100 may employ different types of networks 120, for example, computer networks, telecommunications networks, wireless networks, and/or any combination of these and/or other networks.

In some embodiments, some of the components of the content distribution network 100 can belong to the content network 122. The content network 122 can include, for example, the content management server 102, the database server 104, the privacy server 108, the content server 112, the user data server 114, the administrator server 116, and/or the communication network 120. The content network 122 can be the source of content distributed by the content distribution network 100, which content can include, for example, one or several documents and/or applications or programs. These documents and/or applications or programs are digital content. In some embodiments, these one or several documents and/or applications or programs can include, for example, one or several webpages, presentations, papers, videos, charts, graphs, books, written work, figures, images, graphics, recordings, applets, scripts, or the like.

Figure 2:
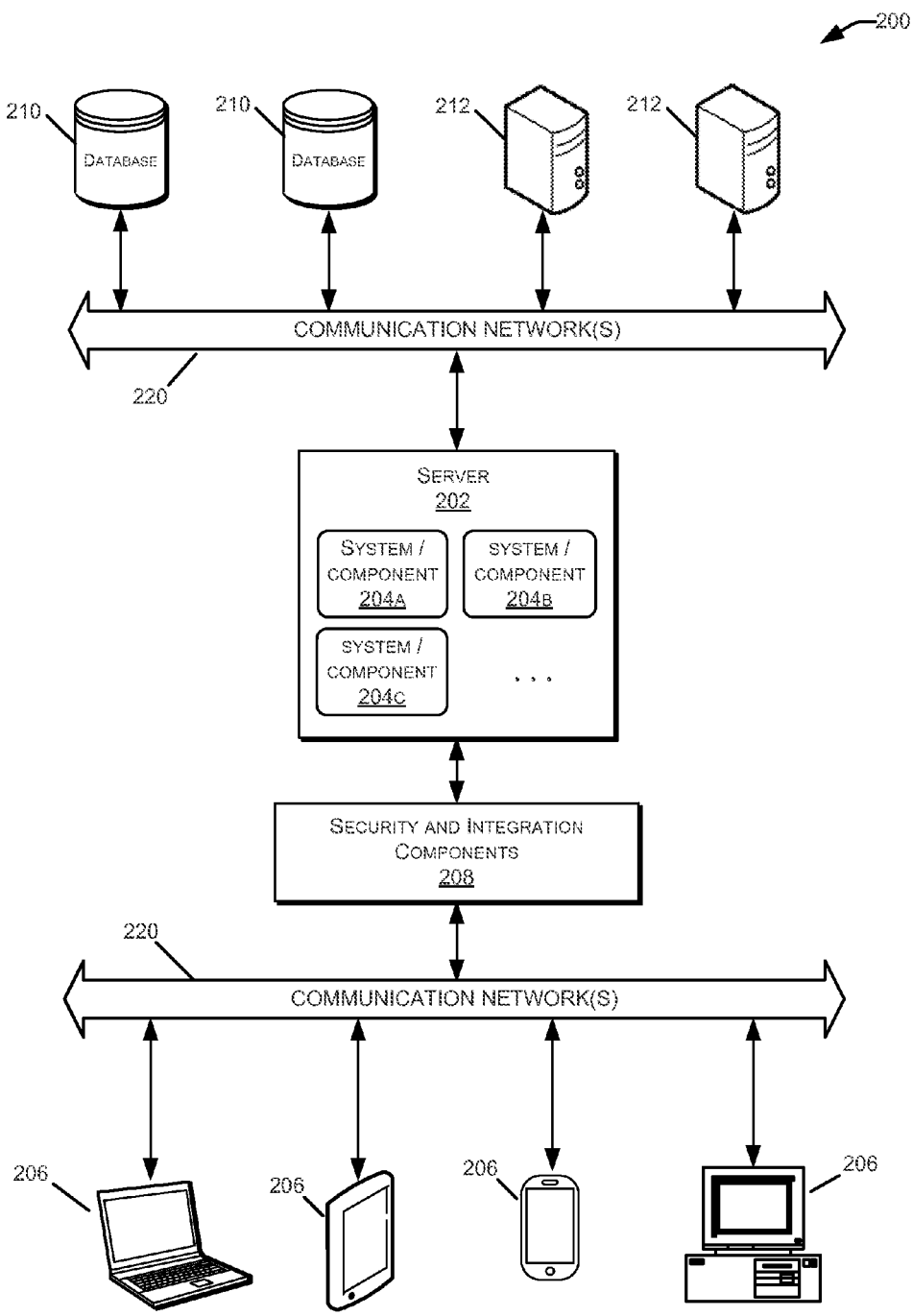
FIG. 2 is a block diagram illustrating a computer server and computing environment within a content distribution network.

With reference to FIG. 2, an illustrative distributed computing environment 200 is shown including a computer server 202, four client computing devices 206, and other components that may implement certain embodiments and features described herein. In some embodiments, the server 202 may correspond to the content management server 102 discussed above in FIG. 1, and the client computing devices 206 may correspond to the user devices 106. However, the computing environment 200 illustrated in FIG. 2 may correspond to any other combination of devices and servers configured to implement a client-server model or other distributed computing architecture.

Client devices 206 may be configured to receive and execute client applications over one or more networks 220. Such client applications may be web browser based applications and/or standalone software applications, such as mobile device applications. Server 202 may be communicatively coupled with the client devices 206 via one or more communication networks 220. Client devices 206 may receive client applications from server 202 or from other application providers (e.g., public or private application stores). Server 202 may be configured to run one or more server software applications or services, for example, web-based or cloud-based services, to support content distribution and interaction with client devices 206. Users operating client devices 206 may in turn utilize one or more client applications (e.g., virtual client applications) to interact with server 202 to utilize the services provided by these components.

Various different subsystems and/or components 204 may be implemented on server 202. Users operating the client devices 206 may initiate one or more client applications to use services provided by these subsystems and components. The subsystems and components within the server 202 and client devices 206 may be implemented in hardware, firmware, software, or combinations thereof. Various different system configurations are possible in different distributed computing systems 200 and content distribution networks 100. The embodiment shown in FIG. 2 is thus one example of a distributed computing system and is not intended to be limiting.

Although exemplary computing environment 200 is shown with four client computing devices 206, any number of client computing devices may be supported. Other devices, such as specialized sensor devices, etc., may interact with client devices 206 and/or server 202.

As shown in FIG. 2, various security and integration components 208 may be used to send and manage communications between the server 202 and user devices 206 over one or more communication networks 220. The security and integration components 208 may include separate servers, such as web servers and/or authentication servers, and/or specialized networking components, such as firewalls, routers, gateways, load balancers, and the like. In some cases, the security and integration components 208 may correspond to a set of dedicated hardware and/or software operating at the same physical location and under the control of same entities as server 202. For example, components 208 may include one or more dedicated web servers and network hardware in a datacenter or a cloud infrastructure. In other examples, the security and integration components 208 may correspond to separate hardware and software components which may be operated at a separate physical location and/or by a separate entity.

Security and integration components 208 may implement various security features for data transmission and storage, such as authenticating users and restricting access to unknown or unauthorized users. In various implementations, security and integration components 208 may provide, for example, a file-based integration scheme or a service-based integration scheme for transmitting data between the various devices in the content distribution network 100. Security and integration components 208 also may use secure data transmission protocols and/or encryption for data transfers, for example, File Transfer Protocol (FTP), Secure File Transfer Protocol (SFTP), and/or Pretty Good Privacy (PGP) encryption.

In some embodiments, one or more web services may be implemented within the security and integration components 208 and/or elsewhere within the content distribution network 100. Such web services, including cross-domain and/or cross-platform web services, may be developed for enterprise use in accordance with various web service standards, such as the Web Service Interoperability (WS-I) guidelines. For example, some web services may use the Secure Sockets Layer (SSL) or Transport Layer Security (TLS) protocol to provide secure connections between the server 202 and user devices 206. SSL or TLS may use HTTP or HTTPS to provide authentication and confidentiality. In other examples, web services may be implemented using the WS-Security standard, which provides for secure SOAP messages using XML encryption. In other examples, the security and integration components 208 may include specialized hardware for providing secure web services. For example, security and integration components 208 may include secure network appliances having built-in features such as hardware-accelerated SSL and HTTPS, WS-Security, and firewalls. Such specialized hardware may be installed and configured in front of any web servers, so that any external devices may communicate directly with the specialized hardware.

Communication network(s) 220 may be any type of network familiar to those skilled in the art that can support data communications using any of a variety of commercially-available protocols, including without limitation, TCP/IP (transmission control protocol/Internet protocol), SNA (systems network architecture), IPX (Internet packet exchange), Secure Sockets Layer (SSL) or Transport Layer Security (TLS) protocols, Hyper Text Transfer Protocol (HTTP) and Secure Hyper Text Transfer Protocol (HTTPS), and the like. Merely by way of example, network(s) 220 may be local area networks (LAN), such as one based on Ethernet, Token-Ring and/or the like. Network(s) 220 also may be wide-area networks, such as the Internet. Networks 220 may include telecommunication networks such as a public switched telephone networks (PSTNs), or virtual networks such as an intranet or an extranet. Infrared and wireless networks (e.g., using the Institute of Electrical and Electronics (IEEE) 802.11 protocol suite or other wireless protocols) also may be included in networks 220.

Computing environment 200 also may include one or more databases 210 and/or back-end servers 212. In certain examples, the databases 210 may correspond to database server(s) 104, the local data server 109, and/or the customizer data server 128 discussed above in FIG. 1, and back-end servers 212 may correspond to the various back-end servers 112-116. Databases 210 and servers 212 may reside in the same datacenter or may operate at a remote location from server 202. In some cases, one or more databases 210 may reside on a non-transitory storage medium within the server 202. Other databases 210 and back-end servers 212 may be remote from server 202 and configured to communicate with server 202 via one or more networks 220. In certain embodiments, databases 210 and back-end servers 212 may reside in a storage-area network (SAN). In some embodiments, the computing environment can be replicated for each of the networks 105, 122, 104 discussed with respect to FIG. 1 above.

Figure 3:
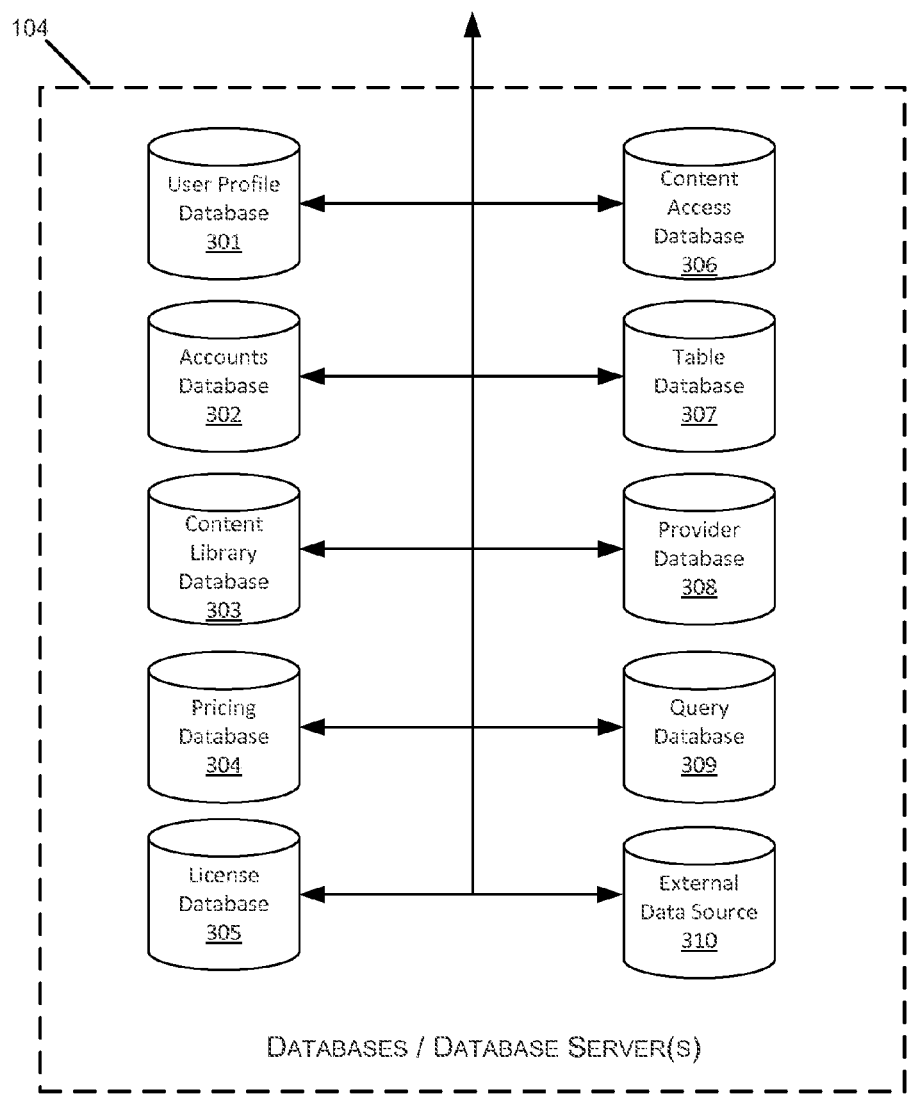
FIG. 3 is a block diagram illustrating an embodiment of one or more database servers within a content distribution network.

With reference to FIG. 3, an illustrative set of databases and/or database servers is shown, corresponding to the databases servers 104 of the content distribution network 100 discussed above in FIG. 1. One or more individual databases 301-310 may reside in storage on a single computer server 104 (or a single server farm or cluster) under the control of a single entity, or may reside on separate servers operated by different entities and/or at remote locations. In some embodiments, databases 301-310 may be accessed by the content management server 102 and/or other devices and servers within the network 100 (e.g., user devices 106, supervisor devices 110, administrator servers 116, etc.). Access to one or more of the databases 301-310 may be limited or denied based on the processes, user credentials, and/or devices attempting to interact with the database.

The paragraphs below describe examples of specific databases that may be implemented within some embodiments of a content distribution network 100. It should be understood that the below descriptions of databases 301-310, including their functionality and types of data stored therein, are illustrative and non-limiting. Database server architecture, design, and the execution of specific databases 301-310 may depend on the context, size, and functional requirements of a content distribution network 100. For example, in content distribution systems 100 used for professional training and educational purposes, separate databases may be implemented in database server(s) 104 to store trainee and/or student data, trainer and/or professor data, training module data and content descriptions, training results, evaluation data, and the like. In contrast, in content distribution systems 100 used for media distribution from content providers to subscribers, separate databases may be implemented in database server(s) 104 to store listing of available content titles and descriptions, content title usage statistics, subscriber profiles, account data, payment data, network usage statistics, etc.

A user profile database 301 may include information relating to the end users within the content distribution network 100. Generally speaking the user profile database 301 can be a database having restrictions on access, which restrictions can relate to whether one or several users or categories of users are enabled to perform one or several actions on the database or on data stored in the database. In some embodiments, the user profile database 301 can include any information for which access is restricted. This information may include user characteristics such as the user names, access credentials (e.g., logins and passwords), user preferences, and information relating to any previous user interactions within the content distribution network 100 (e.g., requested content, posted content, content modules completed, training scores or evaluations, other associated users, etc.). In some embodiments, this information can relate to one or several individual end users such as, for example, one or several students, teachers, administrators, or the like, and in some embodiments, this information can relate to one or several institutional end users such as, for example, one or several schools, groups of schools such as one or several school districts, one or several colleges, one or several universities, one or several training providers, or the like.

In some embodiments, the user profile database 301 can include information relating to a categorization of one or several users, and specifically relating to an access categorization of one or several users. In some embodiments, these categorizations of the one or several users can be relevant to the type or data that the user is allowed to access and/or the degree to which the user can access, edit, retrieve, and/or provide data. These classifications can relate to the level of responsibility of the user so that the user is able to access all data useful to their responsibility. In some embodiments, this data can include personal information collected from one or several individuals such as students, employees, patients, or the like. In embodiments in which this data relates to one or several students associated with the content distribution network 100, these one or several students can be, for example, one or several students taking classes via an institutional user of the content distribution network. In some embodiments, these categories can include, for example, a trusted entity, a first tier administrator, a second tier administrator, a third tier administrator, an instructor, a guardian, and/or a student.

In some embodiments, the trusted entity is allowed to access all data contained within the content distribution network 100, and the first tier administrator is able to access data contained within the content distribution network 100 relating to a first tier describing a largest level of a political entity such as, for example, a school district, a university, a healthcare network, or the like. In some embodiments, the second tier administrator is able to access a subset of the data contained within the content distribution network 100 relating to the first tier, alternatively described as all of the data relating to the second tier describing a sub-level of the political entity such as a school within a school district, a college within a university, a healthcare service provider such as, for example, a clinic or a hospital, in the healthcare network, or the like. In some embodiments, the third tier administrator is able to access a subset of the data contained within the content distribution network 100 relating to the second tier, alternatively described as all of the data relating to the third tier describing a sub-level of the sub-level political entity such as, for example, a department within a school or a college, a group within a healthcare service provider, or the like. In some embodiments, the instructor can be, for example, a healthcare provider such as a doctor or a nurse, a teacher, or the like. The instructor can have access to data relating to, for example, courses or sections taught by the teacher, or patients of the healthcare provider. In some embodiments, the guardian can be an individual with legal responsibility for one or several students or patients and can thus have access to data relating to those one or several students or patients. In some embodiments, the student can be a patient or a student in a course, and can have access to their own information.

In some embodiments in which the one or several end users are individuals, and specifically are students, the user profile database 301 can further include information relating to these students' academic and/or educational history. This information can identify one or several courses of study that the student has initiated, completed, and/or partially completed, as well as grades received in those courses of study. In some embodiments, the student's academic and/or educational history can further include information identifying student performance on one or several tests, quizzes, and/or assignments. In some embodiments, this information can be stored in a tier of memory that is not the fastest memory in the content distribution network 100.

The user profile database 301 can include information relating to one or several student learning preferences. In some embodiments, for example, the student may have one or several preferred learning styles, one or several most effective learning styles, and/or the like. In some embodiments, the students learning style can be any learning style describing how the student best learns or how the student prefers to learn. In one embodiment, these learning styles can include, for example, identification of the student as an auditory learner, as a visual learner, and/or as a tactile learner. In some embodiments, the data identifying one or several student learning styles can include data identifying a learning style based on the student's educational history such as, for example, identifying a student as an auditory learner when the student has received significantly higher grades and/or scores on assignments and/or in courses favorable to auditory learners. In some embodiments, this information can be stored in a tier of memory that is not the fastest memory in the content distribution network 100.

The user profile database 301 can further include information relating to one or several teachers and/or instructors who are responsible for organizing, presenting, and/or managing the presentation of information to the student. In some embodiments, user profile database 301 can include information identifying courses and/or subjects that have been taught by the teacher, data identifying courses and/or subjects currently taught by the teacher, and/or data identifying courses and/or subjects that will be taught by the teacher. In some embodiments, the user profile database 301 can further include information indicating past evaluations and/or evaluation reports received by the teacher. In some embodiments, the user profile database 301 can further include information relating to improvement suggestions received by the teacher, training received by the teacher, continuing education received by the teacher, and/or the like. In some embodiments, this information can be stored in a tier of memory that is not the fastest memory in the content distribution network 100.

An accounts database 302 may generate and store account data for different users in various roles within the content distribution network 100. For example, accounts may be created in an accounts database 302 for individual end users, supervisors, administrator users, and entities such as companies or educational institutions. Account data may include account types, current account status, account characteristics, and any parameters, limits, restrictions associated with the accounts.

A content library database 303 may include information describing the individual content items (or content resources) available via the content distribution network

100. In some embodiments, the library database 303 may include metadata, properties, and other characteristics associated with the content resources stored in the content server 112. In some embodiments, this data can include the one or several items that can include one or several documents and/or one or several applications or programs. In some embodiments, the one or several items can include, for example, one or several webpages, presentations, papers, videos, charts, graphs, books, written work, figures, images, graphics, recordings, or any other document, or any desired software or application or component thereof including, for example, a graphical user interface (GUI), all or portions of a Learning Management System (LMS), all or portions of a Content Management System (CMS), all or portions of a Student Information Systems (SIS), or the like.

In some embodiments, the data in the content library database 303 may identify one or more aspects or content attributes of the associated content resources, for example, subject matter, access level, or skill level of the content resources, license attributes of the content resources (e.g., any limitations and/or restrictions on the licensable use and/or distribution of the content resource), price attributes of the content resources (e.g., a price and/or price structure for determining a payment amount for use or distribution of the content resource), rating attributes for the content resources (e.g., data indicating the evaluation or effectiveness of the content resource), and the like. In some embodiments, the library database 303 may be configured to allow updating of content metadata or properties, and to allow the addition and/or removal of information relating to the content resources. In some embodiments, the content library database 303 can be organized such that content is associated with one or several courses and/or programs in which the content is used and/or provided. In some embodiments, the content library database 303 can further include one or several teaching materials used in the course, a syllabus, one or several practice problems, one or several tests, one or several quizzes, one or several assignments, or the like. All or portions of the content library database can be stored in a tier of memory that is not the fastest memory in the content distribution network 100.

A pricing database 304 may include pricing information and/or pricing structures for determining payment amounts for providing access to the content distribution network 100 and/or the individual content resources within the network 100. In some cases, pricing may be determined based on a user's access to the content distribution network 100, for example, a time-based subscription fee, or pricing based on network usage and. In other cases, pricing may be tied to specific content resources. Certain content resources may have associated pricing information, whereas other pricing determinations may be based on the resources accessed, the profiles and/or accounts of the users, and the desired level of access (e.g., duration of access, network speed, etc.). Additionally, the pricing database 304 may include information relating to compilation pricing for groups of content resources, such as group prices and/or price structures for groupings of resources.

A license database 305 may include information relating to licenses and/or licensing of the content resources within the content distribution network 100. For example, the license database 305 may identify licenses and licensing terms for individual content resources and/or compilations of content resources in the content server 112, the rights holders for the content resources, and/or common or large-scale right holder information such as contact information for rights holders of content not included in the content server 112.

A content access database 306 may include access rights and security information for the content distribution network 100 and specific content resources. For example, the content access database 306 may include login information (e.g., user identifiers, logins, passwords, etc.) that can be verified during user login attempts to the network 100. The content access database 306 also may be used to store assigned roles and/or levels of access to users. For example, a user's access level may correspond to the sets of content resources and/or the client or server applications that the user is permitted to access. Certain users may be permitted or denied access to certain applications and resources based on their subscription level, training program, course/grade level, etc. Certain users may have supervisory access over one or more end users, allowing the supervisor to access all or portions of the end user's content, activities, evaluations, etc. Additionally, certain users may have administrative access over some users and/or some applications in the content management network 100, allowing such users to add and remove user accounts, modify user access permissions, perform maintenance updates on software and servers, etc.

A table database 307 can include information relating to one or several tables. This information can identify one or several tables that can contain information such as the information in the user profile database 301 and can identify one or several providers linked to the one or several tables. In some embodiments, this link to the one or several providers can comprise a pointer to one or several providers identified in a provider database 308 discussed below.

The provider database 308 can include data relating to one or several providers. In some embodiments, a provider can be a group of access rules. These access rules can specify the degree to which one or several categorizations of users can access data contained in one or several tables within the content distribution network 100. Thus, in some embodiments, these rules can identify one or several access restrictions applicable to one or several categories of users when accessing one or several tables and/or data types. In some embodiments, these one or several access restrictions can be in the form of one or several predicates which can be one or several character strings in a programming language that are addable to a query to modify the data the effect of that query. In some embodiments, these predicates can specify one or several rows and/or columns of one or several tables accessible by one or several categories of users and/or one or several rows and/or columns of one or several tables that are not accessible by one or several categories of users.

A query database 309 can include information relating to one or several queries. In some embodiments, this information can include information relating to the parsing of the one or several queries, the results of the parsing of the one or several queries, and/or rules for editing the one or several queries.

In addition to the illustrative databases described above, database server(s) 104 may include one or more external data aggregators 310. External data aggregators 310 may include third-party data sources accessible to the content management network 100, but not maintained by the content management network 100. External data aggregators 310 may include any electronic information source relating to the users, content resources, or applications of the content distribution network 100. For example, external data aggregators 310 may be third-party databases containing demographic data, education related data, consumer sales data, health related data, and the like. Illustrative external data aggregators 310 may include, for example, social networking web servers, public records databases, learning management systems, educational institution servers, business servers, consumer sales databases, medical record databases, etc. Data retrieved from various external data aggregators 310 may be used to verify and update user account information, suggest user content, and perform user and content evaluations.

Figure 4:
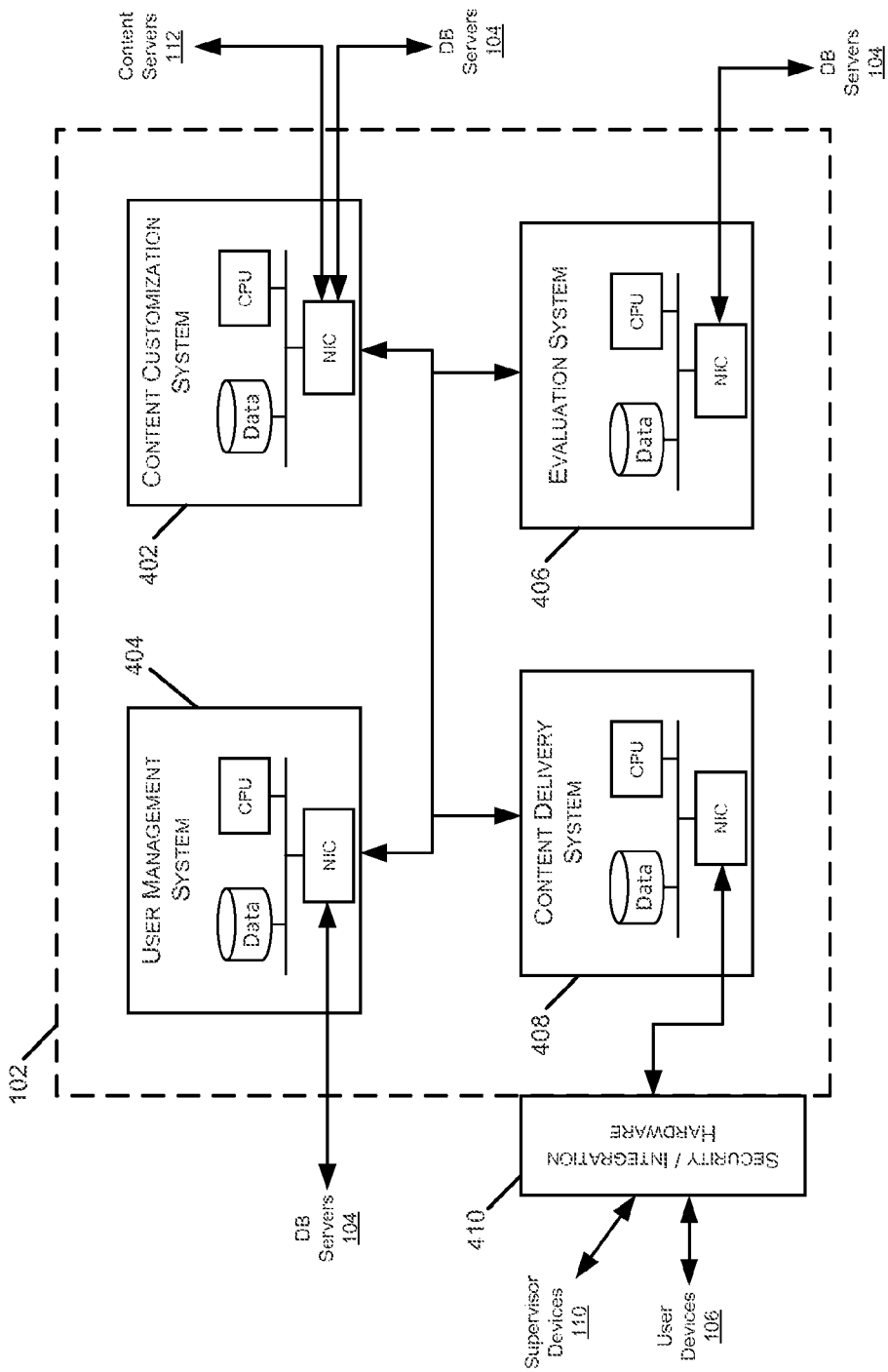
FIG. 4 is a block diagram illustrating an embodiment of one or more content management servers within a content distribution network.

With reference now to FIG. 4, a block diagram is shown illustrating an embodiment of one or more content management servers 102 within a content distribution network 100. As discussed above, content management server(s) 102 may include various server hardware and software components that manage the content resources within the content distribution network 100 and provide interactive and adaptive content to users on various user devices 106. For example, content management server(s) 102 may provide instructions to and receive information from the other devices within the content distribution network 100, in order to manage and transmit content resources, user data, and server or client applications executing within the network 100.

A content management server 102 may include a content customization system 402. The content customization system 402 may be implemented using dedicated hardware within the content distribution network 100 (e.g., a content customization server 402), or using designated hardware and software resources within a shared content management server 102. In some embodiments, the content customization system 402 may adjust the selection and adaptive capabilities of content resources to match the needs and desires of the users receiving the content. For example, the content customization system 402 may query various databases and servers 104 to retrieve user information, such as user preferences and characteristics (e.g., from a user profile database 301), user access restrictions to content recourses (e.g., from a content access database 306), and the like. Based on the retrieved information from databases 104 and other data sources, the content customization system 402 may modify content resources for individual users.

A content management server 102 also may include a user management system 404. The user management system 404 may be implemented using dedicated hardware within the content distribution network 100 (e.g., a user management server 404), or using designated hardware and software resources within a shared content management server 102. In some embodiments, the user management system 404 may monitor the progress of users through various types of content resources and groups, such as media compilations, courses or curriculums in training or educational contexts, interactive gaming environments, and the like. For example, the user management system 404 may query one or more databases and servers 104 to retrieve user data such as associated content compilations or programs, content completion status, user goals, results, and the like.

A content management server 102 also may include an evaluation system 406. The evaluation system 406 may be implemented using dedicated hardware within the content distribution network 100 (e.g., an evaluation server 406), or using designated hardware and software resources within a shared content management server 102. The evaluation system 406 may be configured to receive and analyze information from user devices 106 via, for example, the end-user server 107. For example, various ratings of content resources submitted by users may be compiled and analyzed, and then stored in a database (e.g., a content library database 303 and/or evaluation database 308) associated with the content. In some embodiments, the evaluation server 406 may analyze the information to determine the effectiveness or appropriateness of content resources with, for example, a subject matter, an age group, a skill level, or the like. In some embodiments, the evaluation system 406 may provide updates to the content customization system 402 or the user management system 404, with the attributes of one or more content resources or groups of resources within the network 100. The evaluation system 406 also may receive and analyze user evaluation data from user devices 106, supervisor devices 110, and administrator servers 116, etc. For instance, evaluation system 406 may receive, aggregate, and analyze user evaluation data for different types of users (e.g., end users, supervisors, administrators, etc.) in different contexts (e.g., media consumer ratings, trainee or student comprehension levels, teacher effectiveness levels, gamer skill levels, etc.).

A content management server 102 also may include a content delivery system 408. The content delivery system 408 may be implemented using dedicated hardware within the content distribution network 100 (e.g., a content delivery server 408), or using designated hardware and software resources within a shared content management server 102. The content delivery system 408 may receive content resources from the content customization system 402 and/or from the user management system 404, and provide the resources to user devices 106. The content delivery system 408 may determine the appropriate presentation format for the content resources based on the user characteristics and preferences, and/or the device capabilities of user devices 106. If needed, the content delivery system 408 may convert the content resources to the appropriate presentation format and/or compress the content before transmission. In some embodiments, the content delivery system 408 may also determine the appropriate transmission media and communication protocols for transmission of the content resources.

In some embodiments, the content delivery system 408 may include specialized security and integration hardware 410, along with corresponding software components to implement the appropriate security features content transmission and storage, to provide the supported network and client access models, and to support the performance and scalability requirements of the network 100. The security and integration layer 410 may include some or all of the security and integration components 208 discussed above in FIG. 2, and may control the transmission of content resources and other data, as well as the receipt of requests and content interactions, to and from the user devices 106, supervisor devices 110, administrative servers 116, and other devices in the network 100.

Figure 5:
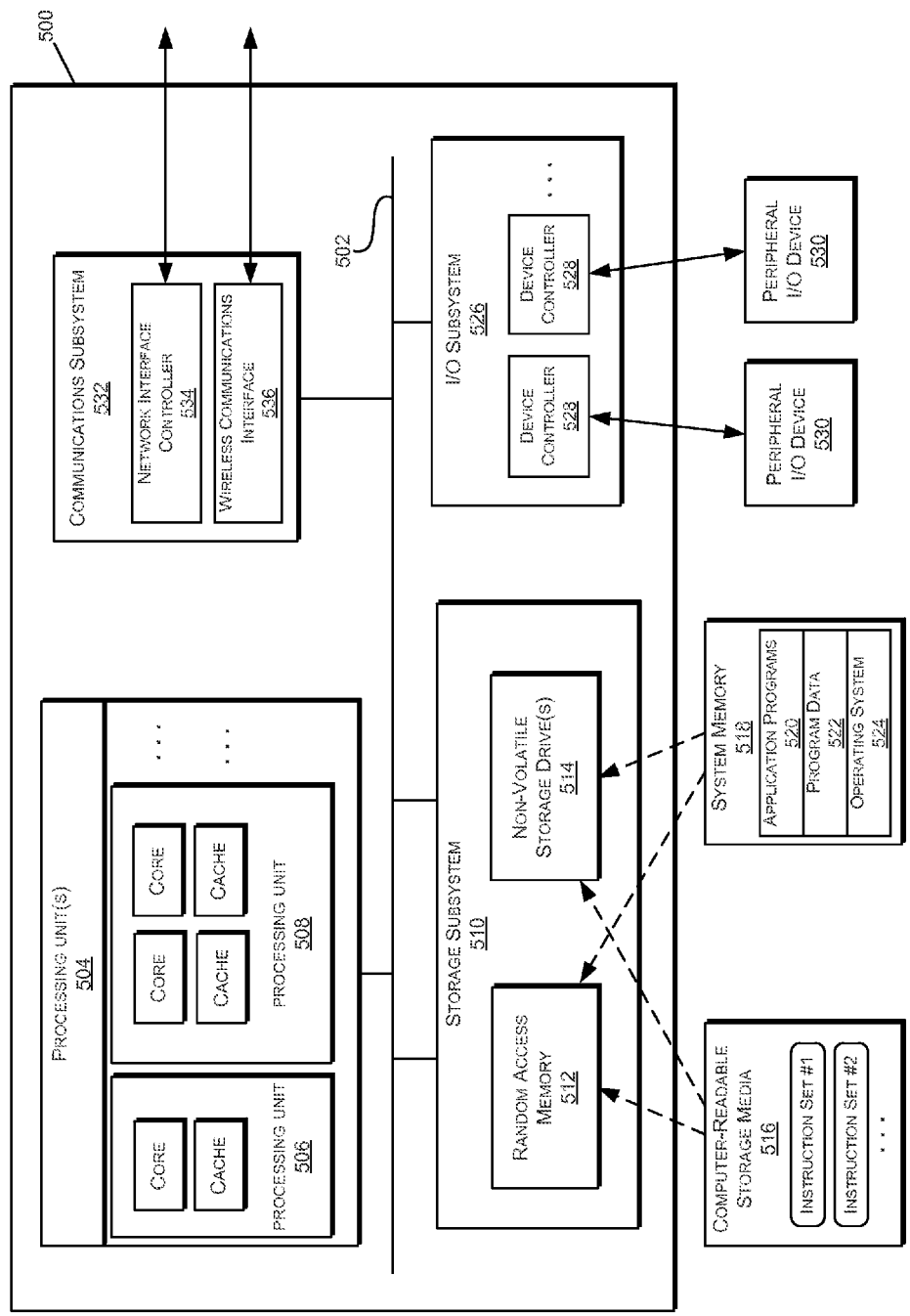
FIG. 5 is a block diagram illustrating the physical and logical components of a special-purpose computer device within a content distribution network.

With reference now to FIG. 5, a block diagram of an illustrative computer system is shown. The system 500 may correspond to any of the computing devices or servers of the content distribution network 100 described above, or any other computing devices described herein. In this example, computer system 500 includes processing units 504 that communicate with a number of peripheral subsystems via a bus subsystem 502. These peripheral subsystems include, for example, a storage subsystem 510, an I/O subsystem 526, and a communications subsystem 532.

Bus subsystem 502 provides a mechanism for letting the various components and subsystems of computer system 500 communicate with each other as intended. Although bus subsystem 502 is shown schematically as a single bus, alternative embodiments of the bus subsystem may utilize multiple buses. Bus subsystem 502 may be any of several types of bus structures including a memory bus or memory controller, a peripheral bus, and a local bus using any of a variety of bus architectures. Such architectures may include, for example, an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 504, which may be implemented as one or more integrated circuits (e.g., a conventional microprocessor or microcontroller), controls the operation of computer system 500. One or more processors, including single core and/or multicore processors, may be included in processing unit 504. As shown in the figure, processing unit 504 may be implemented as one or more independent processing units 506 and/or 508 with single or multicore processors and processor caches included in each processing unit. In other embodiments, processing unit 504 may also be implemented as a quad-core processing unit or larger multicore designs (e.g., hexa-core processors, octo-core processors, ten-core processors, or greater.

Processing unit 504 may execute a variety of software processes embodied in program code, and may maintain multiple concurrently executing programs or processes. At any given time, some or all of the program code to be executed can be resident in processor(s) 504 and/or in storage subsystem 510. In some embodiments, computer system 500 may include one or more specialized processors, such as digital signal processors (DSPs), outboard processors, graphics processors, application-specific processors, and/or the like.

I/O subsystem 526 may include device controllers 528 for one or more user interface input devices and/or user interface output devices 530. User interface input and output devices 530 may be integral with the computer system 500 (e.g., integrated audio/video systems, and/or touchscreen displays), or may be separate peripheral devices which are attachable/detachable from the computer system 500.

Input devices 530 may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. Input devices 530 may also include three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additional input devices 530 may include, for example, motion sensing and/or gesture recognition devices that enable users to control and interact with an input device through a natural user interface using gestures and spoken commands, eye gesture recognition devices that detect eye activity from users and transform the eye gestures as input into an input device, voice recognition sensing devices that enable users to interact with voice recognition systems through voice commands, medical imaging input devices, MIDI keyboards, digital musical instruments, and the like.

Output devices 530 may include one or more display subsystems, indicator lights, or non-visual displays such as audio output devices, etc. Display subsystems may include, for example, cathode ray tube (CRT) displays, flat-panel devices, such as those using a liquid crystal display (LCD) or plasma display, projection devices, touch screens, and the like. In general, use of the term "output device" is intended to include all possible types of devices and mechanisms for outputting information from computer system 500 to a user or other computer. For example, output devices 530 may include, without limitation, a variety of display devices that visually convey text, graphics and audio/video information such as monitors, printers, speakers, headphones, automotive navigation systems, plotters, voice output devices, and modems.

Computer system 500 may comprise one or more storage subsystems 510, comprising hardware and software components used for storing data and program instructions, such as system memory 518 and computer-readable storage media 516. The system memory 518 and/or computer-readable storage media 516 may store program instructions that are loadable and executable on processing units 504, as well as data generated during the execution of these programs.

Depending on the configuration and type of computer system 500, system memory 318 may be stored in volatile memory (such as random access memory (RAM) 512) and/or in non-volatile storage drives 514 (such as read-only memory (ROM), flash memory, etc.) The RAM 512 may contain data and/or program modules that are immediately accessible to and/or presently being operated and executed by processing units 504. In some implementations, system memory 518 may include multiple different types of memory, such as static random access memory (SRAM) or dynamic random access memory (DRAM). In some implementations, a basic input/output system (BIOS), containing the basic routines that help to transfer information between elements within computer system 500, such as during start-up, may typically be stored in the non-volatile storage drives 514. By way of example, and not limitation, system memory 518 may include application programs 520, such as client applications, Web browsers, mid-tier applications, server applications, etc., program data 522, and an operating system 524.

Storage subsystem 510 also may provide one or more tangible computer-readable storage media 516 for storing the basic programming and data constructs that provide the functionality of some embodiments. Software (programs, code modules, instructions) that when executed by a processor provide the functionality described herein may be stored in storage subsystem 510. These software modules or instructions may be executed by processing units 504. Storage subsystem 510 may also provide a repository for storing data used in accordance with the present invention.

Storage subsystem 300 may also include a computer-readable storage media reader that can further be connected to computer-readable storage media 516. Together and, optionally, in combination with system memory 518, computer-readable storage media 516 may comprehensively represent remote, local, fixed, and/or removable storage devices plus storage media for temporarily and/or more permanently containing, storing, transmitting, and retrieving computer-readable information.

Computer-readable storage media 516 containing program code, or portions of program code, may include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 500.

By way of example, computer-readable storage media 516 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 516 may include, but is not limited to, Zip® drives, flash memory cards, universal serial bus (USB) flash drives, secure digital (SD) cards, DVD disks, digital video tape, and the like. Computer-readable storage media 516 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 500.

Communications subsystem 532 may provide a communication interface from computer system 500 and external computing devices via one or more communication networks, including local area networks (LANs), wide area networks (WANs) (e.g., the Internet), and various wireless telecommunications networks. As illustrated in FIG. 5, the communications subsystem 532 may include, for example, one or more network interface controllers (NICs) 534, such as Ethernet cards, Asynchronous Transfer Mode NICs, Token Ring NICs, and the like, as well as one or more wireless communications interfaces 536, such as wireless network interface controllers (WNICs), wireless network adapters, and the like. Additionally and/or alternatively, the communications subsystem 532 may include one or more modems (telephone, satellite, cable, ISDN), synchronous or asynchronous digital subscriber line (DSL) units, FireWire® interfaces, USB® interfaces, and the like. Communications subsystem 536 also may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components.

The various physical components of the communications subsystem 532 may be detachable components coupled to the computer system 500 via a computer network, a FireWire® bus, or the like, and/or may be physically integrated onto a motherboard of the computer system 500. Communications subsystem 532 also may be implemented in whole or in part by software.

In some embodiments, communications subsystem 532 may also receive input communication in the form of structured and/or unstructured data feeds, event streams, event updates, and the like, on behalf of one or more users who may use or access computer system 500. For example, communications subsystem 532 may be configured to receive data feeds in real-time from users of social networks and/or other communication services, web feeds such as Rich Site Summary (RSS) feeds, and/or real-time updates from one or more third party information sources (e.g., data aggregators 310). Additionally, communications subsystem 532 may be configured to receive data in the form of continuous data streams, which may include event streams of real-time events and/or event updates (e.g., sensor data applications, financial tickers, network performance measuring tools, clickstream analysis tools, automobile traffic monitoring, etc.). Communications subsystem 532 may output such structured and/or unstructured data feeds, event streams, event updates, and the like to one or more databases 104 that may be in communication with one or more streaming data source computers coupled to computer system 500.

Due to the ever-changing nature of computers and networks, the description of computer system 500 depicted in the figure is intended only as a specific example. Many other configurations having more or fewer components than the system depicted in the figure are possible. For example, customized hardware might also be used and/or particular elements might be implemented in hardware, firmware, software, or a combination. Further, connection to other computing devices, such as network input/output devices, may be employed. Based on the disclosure and teachings provided herein, a person of ordinary skill in the art will appreciate other ways and/or methods to implement the various embodiments.

Figure 6:
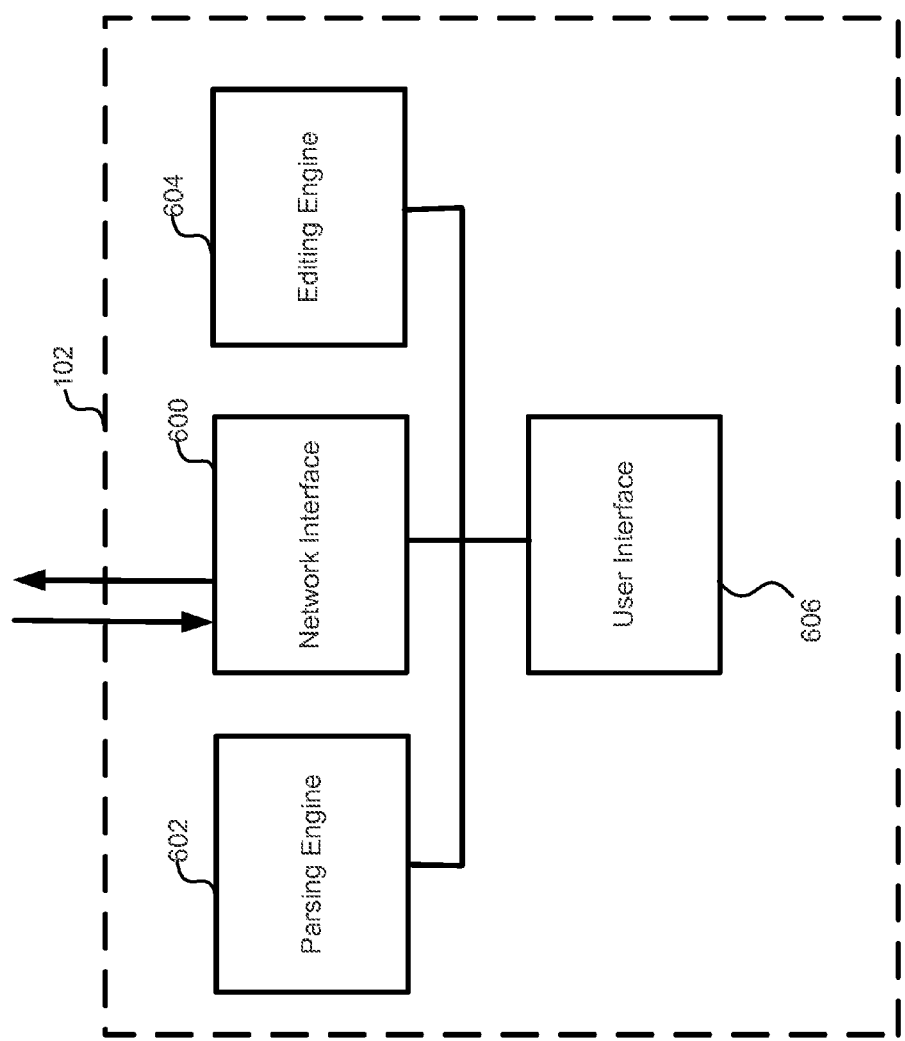
FIG. 6 is a schematic illustration of one embodiment of a content management server.

With reference now to FIG. 6, a block diagram of one embodiment of the content management server 102 is shown. As discussed above, the content management server 102 can be configured to provide information to and/or receive information from other components of the content delivery network 100. As depicted in FIG. 6, the content management server 102 can include a network interface 600. The network interface 600 allows the content management server 102 to access the other components of the content delivery network 100. The network interface 600 can include features configured to send and receive information, including, for example, an antenna, a modem, a transmitter, receiver, or any other feature that can send and receive information. The network interface 600 can communicate via telephone, cable, fiber-optic, or any other wired communication network. In some embodiments, the network interface 600 can communicate via cellular networks, WLAN networks, or any other wireless network.

The content management server 102 can include, for example, a parsing engine 602. The parsing engine 602 can be configured to receive one or several queries and to parse the one or several queries. In some embodiments, the parsing of the one or several queries can include analyzing the character string forming the query, either in natural language or in the programming language of the query languages according to the rules of formal grammar of that programming language. In some embodiments, the parsing engine 602 can be configured to generate an Abstract Syntax Tree (AST) representing the query, which AST can be a tree representation of the abstract syntactic structure of the query.

The content management server 102 can include an editing engine 604. The editing engine can be configured to edit the query. The editing of the query can include the addition of one or several predicates to the query. In some embodiments, this editing can include the addition of one or several clauses to incorporate the one or several predicates into the query. By way of example, in some embodiments, these one or several clauses can include the prepending of a "WITH" clause to one or several queries followed by the one or several predicates.

The content management server 102 can include a user interface 606 that communicates information to, and receives inputs from, a user. The user interface 606 can include a screen, a speaker, a monitor, a keyboard, a microphone, a mouse, a touchpad, a keypad, a touchscreen, or any other feature or features that can receive inputs from a user and provide information to a user.

Figure 7:
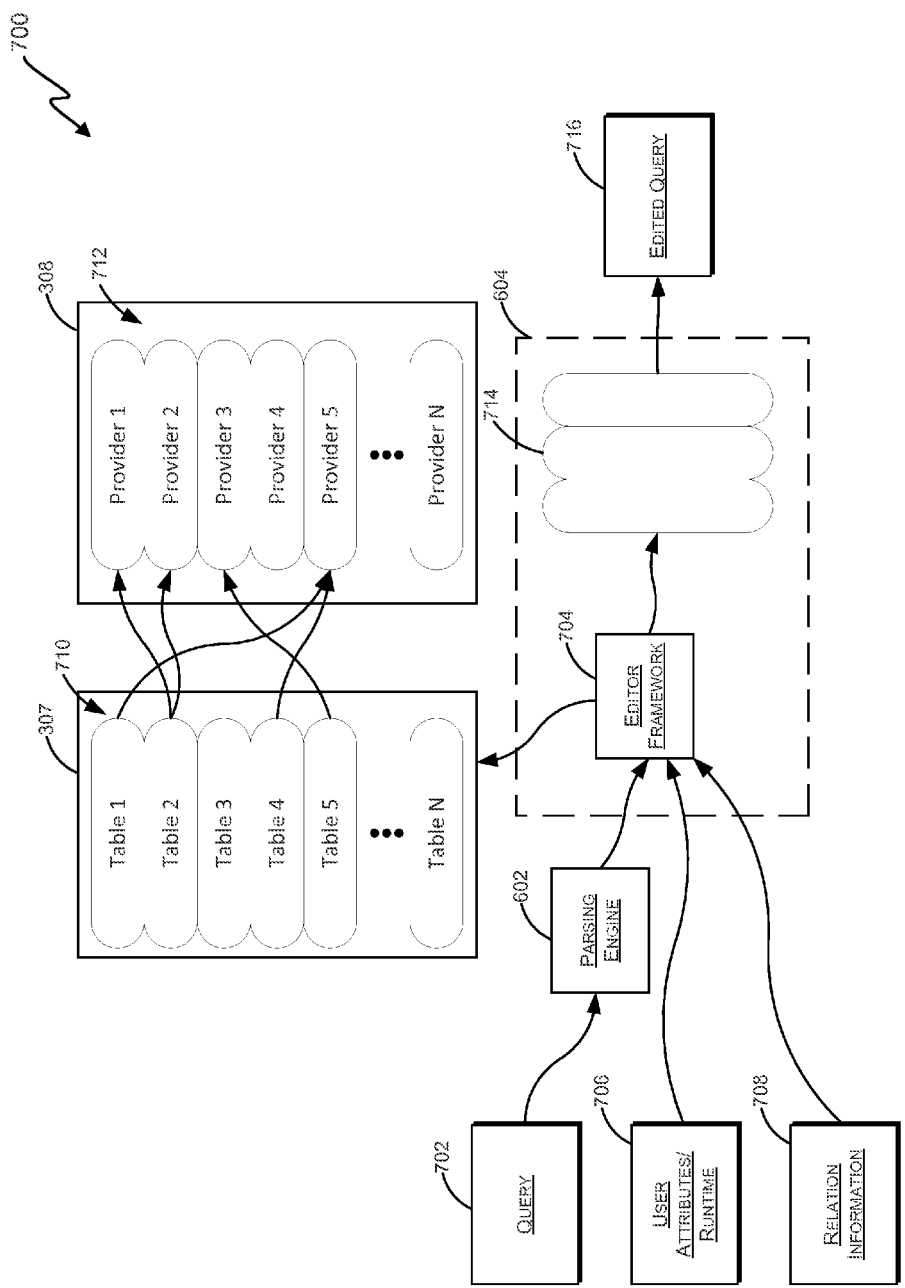
FIG. 7 is a schematic illustration of one embodiment of a process for data restriction.

With reference now to FIG. 7, a schematic illustration of one embodiment of a process 700 for data restriction is shown. The process begins when a query 702 is provided to the parsing engine 602. The parsing engine 602 parses the query to identify one or several tables from which data is requested by the query, and the parsing engine 602 provides the parsed query to the editor framework 704 which can be a part of the editing engine 604. In some embodiments, the editor framework can further receive one or several user attributes and/or runtime conditions 706 from the user device 106 and/or relation information 708 indicating if and/or how the one or several tables identified in the query are connected.

The editor framework 704 communicates with the table database 307, and specifically provides information indicative of the tables identified in the query to the table database 307. The table database 307 contains table information 710 linked to provider information 712 in the provider database 308. With the information indicative of the tables identified in the query, the table database provides identifies the relevant table information 710. The relevant table information 710 is then used by, for example, the editing engine 604 to identify and/or retrieve the one or several relevant providers 712 and their one or several predicates.

The editing engine 604 then stacks these one or several providers and/or predicates as shown in 714, applies any relevant relation information to the stacked one or several providers and/or predicates, and then generates an edited query 716. This edited query can then be used to access data in, edit data in, provide data to, and/or retrieve data from the tables identified in the query.

Figure 8:
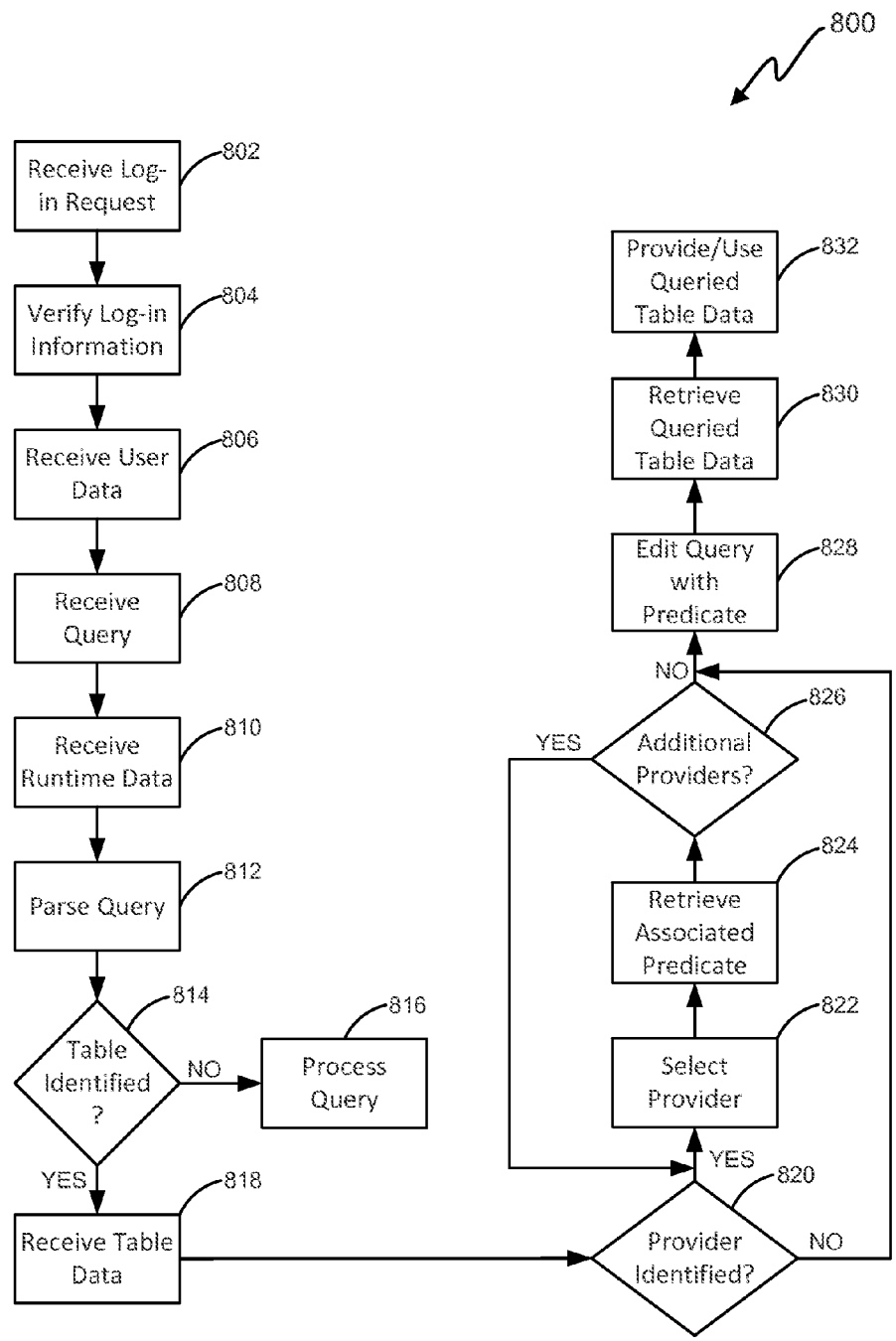
FIG. 8 is a flowchart illustrating one embodiment of a process for data restriction via automatic modification of a query.

With reference now to FIG. 8, a flowchart illustrating one embodiment of a process 800 for data restriction via automatic modification of a query is shown. The process 800 can be performed by the content distribution network 100 and/or components thereof, and specifically can be performed by the content management server 102.

The process 800 begins at block 802, wherein a log-in request is received. In some embodiments, the log-in request can be received from one of the devices 106, 110 via communication network 120. The log-in request can include information used to determine and/or validate the identity of the user, as well as to determine whether the user is allowed to log-in. The log-in can include, for example, a username and a password, a unique user identifier, or the like. After the log-in information has been received, the process 800 proceeds to block 804, wherein the log-in information is verified. In some embodiments, this can include comparing the received log-in information to log-in information stored in the database, and particularly in the user profile database 301. If the received log-in information matches stored log-in information, then the log-in can be verified and access to the content management network 100 can be granted. Alternatively, if the log-in information cannot be verified, then the log-in is denied.

After the log-in information has been verified, the process 800 proceeds to block 806, wherein user data is received. In some embodiments, this user data can be received simultaneous with the log-in information, and in some embodiments, this user data can be received separate from the log-in information. In some embodiments, for example, the received log-in data can be used to identify and retrieve the relevant user data from the user profile database 301. This user data can include, for example, information categorizing the user, and specifically providing an access category for the user.

After the user data has been retrieved, the process 800 proceeds to block 808, wherein a query is received. In some embodiments, this query can be a named query, also referred to herein as a power query, and in some embodiments, this query can be a table query. In some embodiments, a named query are arbitrary SQL that can be specified by system users. Such a named query can query and return data from nearly any combination of tables in the database 104. In some embodiments, a table queries can be a direct query of a single table in the database 104.

The query can be received from one of the devices 106, 110, and specifically can be received as the result of the operation of some software resident on the device 106, 110 and/or the operation of some software resident in the content network 122. The query can include information requesting to access data in the content network 122, and specifically to access data within a table in, for example, the user profile database 301. This query can specify, for example, one or several of a row and a column as the source of data, and/or the type of data to be retrieved. In one embodiment, for example, the query can comprise a character string according to a computer programming language such as, for example SQL.

After the query has been received, the process 800 proceeds to block 810, wherein runtime data is received. In some embodiments, the runtime data can be received from the device 106, 110 being used to access the content distribution network 100 via the communication network 120. The runtime data can identify one or several operating characteristics of the device 106, 110 such as, for example, hardware, software, hardware configuration, software configuration, or the like of the device 106, 110. In some embodiments, this can include, for example, information relating to security software and/or capabilities of the device 106, 110.

After the runtime data has been received, the process 800 proceeds to block 812, wherein the query is parsed. In some embodiments, the query can be parsed by the parsing engine 602. The parsing of the one or several queries can include analyzing the character string forming the query, either in natural language or in the programming language of the query languages according to the rules of formal grammar of that programming language. This parsing can include the generation of the AST representing the query.

In some embodiments, the parsing of the query can additionally include the evaluation of the query, and specifically the evaluation of the requested action associated with the query. In some embodiments, these requested actions can include, for example, to access data in, to provide data to, to edit data in, and/or to retrieve data from one or several of the tables. The determination of the requested action associated with the query can be performed to determine a desired level of security associated with that action as in some embodiments, equal levels of security can be provided for all potential actions associated with the query and in some embodiments, different levels of security can be provided for different potential actions associated with the query. In some particular embodiments, for example, data restrictions can be applied to queries in which the query requests to access, edit, and/or retrieve data from one or several of the tables.

After the query has been parsed, the process 800 proceeds to decision state 814, wherein it is determined if a table is identified in the parsed query. In some embodiments, this can include determining if the parsing of the query resulted in the isolation of one or several groups of one or several characters forming the name of at least one of the tables. If a table has not been identified, then the process 800 proceeds to block 816, wherein the query is processed, in some embodiments, without any data restrictions. In other embodiments, unidentified tables are considered to be unknown and having security attributes that cannot be verified. In these embodiments, unidentified tables can be assumed to contain sensitive information, and thus access to these tables can be denied.

Returning again to decision state 814, if it is determined that a table is identified in the query, then the process 800 proceeds to block 818, wherein table data is identified and/or received from, for example, the table database 307. In some embodiments, the table data can identify one or several tables that can contain information such as the information in the user profile database 301. In some embodiments, the table data can include information identifying one or several providers linked to the one or several tables. In the embodiment of process 800, table data can be identified and/or received that corresponds to the table identified during the parsing of the query in block 812.

After the table data has been received, the process 800 proceeds to decision state 820, wherein it is determined if the table data identifies an identifier. In some embodiments, and as seen in FIG. 7, the table data associated with one table can identify zero, one, or several providers. As specifically shown in FIG. 7, Table 1 is identifies one provider, Provider 5, Table 2 identifies both Provider 1 and Provider 2, and Table 3 does not identify any provider.

If it is determined that at least one provider has been identified, then the process 800 proceeds to block 822, wherein a provider is selected. After the provider has been selected, the process 800 proceeds to block 824, wherein one or several predicates associated with the selected provider are retrieved. These one or several predicates can be retrieved from the provider database 308.

After the one or several predicates have been retrieved, the process 800 proceeds to decision state 826, wherein it is determined if any additional providers were identified by the table data. In some embodiments, this decision state can be used to distinguish between the situation of Table 1 in FIG. 7 that is connected to one provider and Table 2 in FIG. 7 which is connected to more than one provider. If it is determined that additional, as yet unselected providers have been identified, then the process 800 returns to block 822, and proceeds as outlined above.

Returning again to decision state 826, if it is determined that there are no additional providers associated with the identified table, then the process 800 proceeds to block 828, wherein the query edited with the one or several predicates retrieved in block 824. In some embodiments, this can include the insertion of the one or several predicates into the query, and particularly the insertion of the one or several predicates into the query with the inclusion of a clause, such as, for example, a pre-pended "WITH" clause. The query can be edited by the editing engine 604.

After the query has been edited, the process 800 proceeds to block 830, wherein action associated with the query is performed. In some embodiments, this can include the retrieval of data, the editing of data, the providing of data, and/or the accessing of data contained in one or several of the tables. After the queried table data has been retrieved, the process 800 proceeds to block 832, wherein any accessed and/or retrieved data is provided to the device 106, 110 and/or any edited and/or provided data is stored in one of the tables.

Figure 9:
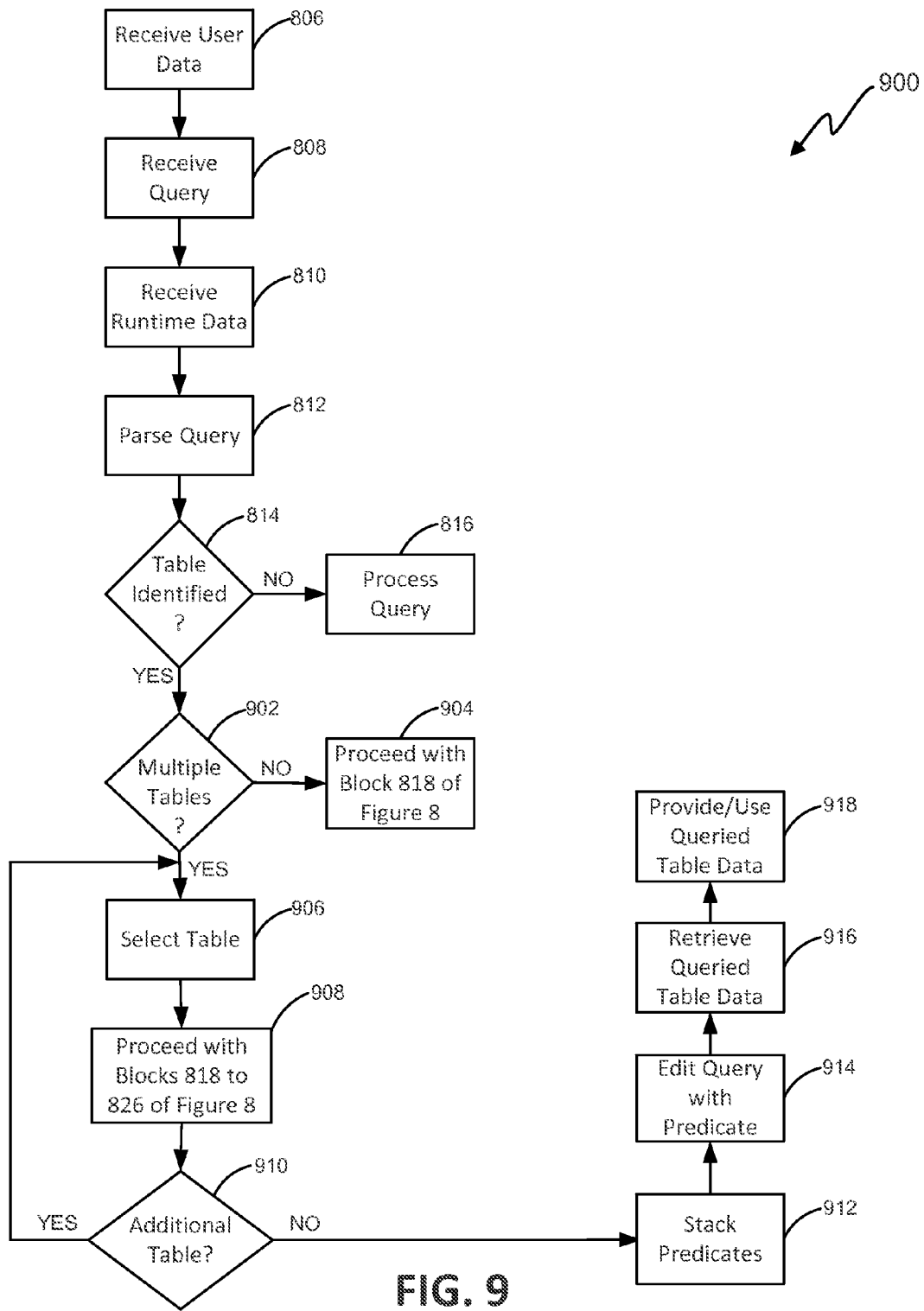
FIG. 9 is a flowchart illustrating one embodiment of a process for data restriction via automatic modification of a query requesting data from multiple tables.

With reference now to FIG. 9, a flowchart illustrating one embodiment of a process 900 for data restriction via automatic modification of a query requesting data from multiple tables is shown. The process begins with blocks 806 to 812 discussed in FIG. 8 with respect to process 800, wherein the user data is received, the query is received, the runtime data is received, and the query is parsed. After the query has been parsed, the process 900 proceeds to decision state 814, wherein it is determined if a table is identified in the query. If no table is identified in the query, then the process 900 proceeds to block 816, wherein the query is processed.

Returning again to decision state 814, if it is determined that a table is identified in the query, then the process 900 proceeds to decision state 902, wherein it is determined if multiple tables are identified in the query. In some embodiments, this can include maintaining a count associated with each query, and incrementing the count each time a character string indicating a table is identified in the query. In such an embodiment, multiple tables are identified if the count is a value greater than any preselected value such as, for example, if the count is a value greater than 1.

If it is determined that only a single table is identified in the query, then the process 900 proceeds to block 904, and continues to block 818 of process 800 of FIG. 8. Returning again to decision state 902, if it is determined that multiple tables are identified, then the process 900 proceeds to block 906 and a table is selected. In some embodiments, the selected table can be one of the multiple tables identified in the query. After the table has been selected, the process 900 proceeds to block 908 and proceeds through blocks 818 to 826 of process 800 of FIG. 8. If it is determined in decision state 820 that there is no provider associated with the selected table, or if it is determined in decision state 826 that there are no additional providers for the selected table, then the process 900 proceeds to decision state 910, wherein it is determined if there is an additional, unselected table that is identified in the query. If it is determined that there is an additional table, then the process 900 returns to block 906 and proceeds as outlined above.

Returning again to decision state 910, if it is determined that there is not an additional table, then the process 900 proceeds to block 912, wherein the providers for the different tables and/or the predicates for the different providers are stacked. In some embodiments, the stacking of the providers and/or predicates can be the sequential arrangement of the providers and/or predicates to allow the editing engine to pass the query through some or all of the providers and/or predicates to modify the query.

After the providers and/or predicates have been stacked, the process 900 proceeds to block 914, wherein the query is edited with the one or several predicates retrieved in block 824. In some embodiments, this can include the insertion of the one or several predicates into the query, and particularly the insertion of the one or several predicates into the query with the inclusion of a clause, such as, for example, a pre-pended "WITH" clause. The query can be edited by the editing engine 604.

After the query has been edited, the process 900 proceeds to block 916, wherein action associated with the query is performed. In some embodiments, this can include the retrieval of data, the editing of data, the providing of data, and/or the accessing of data contained in one or several of the tables. After the queried table data has been retrieved, the process 900 proceeds to block 918, wherein any accessed and/or retrieved data is provided to the device 106, 110 and/or any edited and/or provided data is stored in one of the tables.

Figure 10:
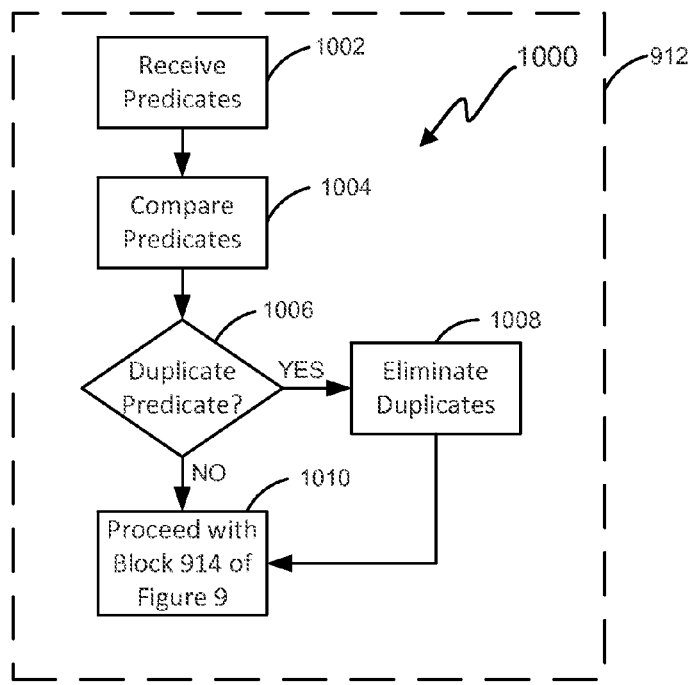
FIG. 10 is a flowchart illustrating one embodiment of a process for selecting predicates for insertion into a query.

With reference now to FIG. 10, a flowchart illustrating one embodiment of a process 1000 for selecting predicates for insertion into a query is shown. In some embodiments, the process 1000 can be performed as a part of the step of block 912 of process 900 of FIG. 9, and in some embodiments, the process 1000 can be performed in the place of the step of block 912 of process 900 of FIG. 9. The process 1000 begins at block 1002, wherein the predicates are received. In some embodiments, the predicates of the stacked providers and/or forming the stacked predicates can be received by the content management server 102. After the predicates have been received, the process 1000 proceeds to block 1004, wherein the predicates are compared. In some embodiments, this comparison can be performed to determine whether multiple of the predicates are identical. In some embodiments, a first value can be associated with duplicate predicates, and a second value can be associated with non-duplicate predicates.

After the predicates have been compared, the process 1000 proceeds to decision state 1006, wherein it is determined if there are any duplicate predicates in the received predicates. In some embodiments, this determination can be performed by receiving the results of the comparison of the predicates in block 1004. In other embodiments, the user defining the query may specify predicates to be eliminated from the stacked predicates and/or added to the stacked predicates. In embodiments in which one or several predicates are indicated for elimination, the request to eliminate the predicate can be verified, and the user's authority to eliminate the predicate can be verified.

If it is determined that there are duplicate predicates, then the process 1000 proceeds to block 1008, wherein duplicate predicates are eliminated from the stacked providers and/or stacked predicates. After the duplicate predicates have been eliminated, or returning again to decision state 1006, if it is determined that there are no duplicate predicates, the process 1000 proceeds to block 1010, and proceeds to block 914 of the process 900 of FIG. 9.

Figure 11:
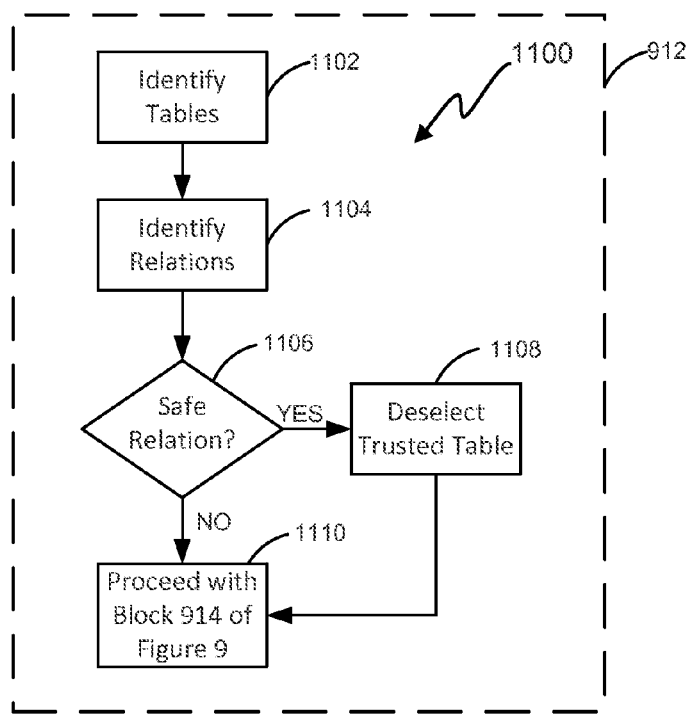
FIG. 11 is a flowchart illustrating one embodiment of a process for streamlining data restriction via automatic modification of a query requesting data from multiple tables.

With reference now to FIG. 11, a flowchart illustrating one embodiment of a process 1100 for streamlining data restriction via automatic modification of a query requesting data from multiple tables is shown. In some embodiments, the process 1100 can be performed as a part of the step of block 912 of process 900 of FIG. 9, and in some embodiments, the process 1100 can be performed in the place of the step of block 912 of process 900 of FIG. 9. The process 1100 begins at block 1102, wherein the tables associated with the stacked providers are identified. After the tables have been received, the process 1100 proceeds to block 1104, wherein relations between the identified tables are identified. In some embodiments, this can include retrieving relation information from one of the databases such as the table database 307 and/or receiving the relation information from the device 106, 110. In some embodiments, the relation information can identify whether safe data access can be achieved without restricting data access to one of the tables of the multiple of tables beyond restrictions provided by the predicates of other tables. Such relations in which safe data access to data in one of the tables can be achieved without restricting data access to that one of the tables beyond restrictions provided by the predicates of other tables are referred to herein as "safe relations."

After the relations between the identified tables have been identified, the process 1100 proceeds to decision state 1106, wherein it is determined whether any safe relations exist within the multiple tables. In some embodiments, this determination can include evaluating the relations data to see whether any safe relations are identified in the relations data. If it is determined that there are safe relations, then the process 1100 proceeds to block 1108 and any trusted tables, which are tables in which safe data access can be achieved without restricting data access to that table beyond restrictions provided by the predicates of other tables, are deselected such that any provider(s) and/or predicate(s) associated with the trusted table are removed from the stacked providers and/or predicates. After the trusted tables have been deselected, or returning to decision state 1106, if it is determined that there are not safe relations, then the process 1100 proceeds to block 1110 and continues with block 914 of FIG. 9.

A number of variations and modifications of the disclosed embodiments can also be used. Specific details are given in the above description to provide a thorough understanding of the embodiments. However, it is understood that the embodiments may be practiced without these specific details. For example, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine-readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine-readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A method for managing access to information via a modification of a request for information, the method comprising:
   receiving, by a network interface of a content management server, a query from a user device, wherein:
   the query comprises a character string arranged according to a programming language,
   the query identifies a first table comprising a row and a column, and
   the query identifies at least one of the row and column for data retrieval;
   receiving user attribute information relating to a user of the user device, wherein the user attribute information identifies a categorization of the user;
   parsing the query with a programming language parser;
   retrieving an access rule corresponding to the first table in the query and the user attribute information, wherein the access rule identifies a limitation of accessibility of data in the first table;
   in response to a determination that an additional data access provider is associated with the first table, retrieving the additional data access provider associated with the first table;
   retrieving a predicate associated with the additional data access provider, the predicate comprising a pre-created text string insertable into the query to modify a scope of the query and the predicate restricting the user to access columns and rows of the first table;
   editing, by the content management server, the query based on the access rule by inserting the predicate into the character string; and
   using the edited query with the predicate to access data in the first table that is accessible to the user according to the limitation of accessibility of data corresponding to the access rule.

2. The method of claim 1, wherein the query comprises a named query.

3. The method of claim 1, wherein the query comprises a table query.

4. The method of claim 1, wherein parsing the query with a programming language parser comprises building an abstract syntax tree representing the query.

5. The method of claim 1, wherein retrieving the access rule corresponding to the first table in the query and the user attribute information comprises:
   in response to a determination that the first table is identified in the query, retrieving the access rule corresponding to the first table in the query; and
   upon identifying the first table in the query, retrieving the user attribute information.

6. The method of claim 5, wherein retrieving the access rule corresponding to the first table in the query and the user attribute information comprises:
   retrieving data associated with the first table in the query;
   in response to a determination that a data access provider is identified in the data associated with the first table in the query; and
   selecting the data access provider when the data access provider is identified in the data associated with the first table in the query.

7. The method of claim 6, wherein retrieving the access rule corresponding to the first table in the query and the user attribute information comprises:
   retrieving a second predicate associated with the additional data access provider associated with the first table.

8. The method of claim 7, further comprising:
   in response to a determination that a second table is associated with the query, identifying a provider associated with the second table; and
   retrieving a third predicate associated with the second table.

9. The method of claim 8, further comprising stacking a plurality of predicates associated with the first table and the second table.

10. The method of claim 9, wherein editing the query based on the access rule by modifying a portion of the character string comprises inserting the stacked plurality of predicates associated with the first table and the second table into the character string of the query.

11. A system for managing access to information via a modification of a request for information, the system comprising:
   a memory comprising:
   a database comprising data arranged in a plurality of tables;
   a table database containing information relating to one or several tables; and
   a data access provider database including at least one group of access rules specifying the accessibility of the data arranged in the plurality of tables by one or several categorizations of users; and
   a processor configured to:
   receive a query from a user device, wherein:

the query comprises a character string arranged according to a programming language, the query identifies a first table comprising a row and a column, the first table is one of the plurality of tables of the database, and the query identifies at least one of: the row or column for data retrieval;

receive user attribute information relating to a user of the user device, wherein the user attribute information identifies a categorization of the user;

parse the query with a programming language parser;

retrieve an access rule corresponding to the first table in the query and the user attribute information, wherein the access rule identifies a limitation of accessibility of data in the first table;

in response to a determination that an additional data access provider is associated with the first table, retrieve the additional data access provider associated with the first table;

retrieve a predicate associated with the additional data access provider, the predicate comprising a pre-created text string insertable into the query to modify a scope of the query and the predicate restricting the user to access columns and rows of the first table;

edit the query based on the access rule by inserting the predicate into the character string; and use the edited query with the predicate to access data in the first table that is accessible to the user according to the limitation of accessibility of data corresponding to the access rule.

12. The system of claim 11, wherein parsing the query with a programming language parser comprises building an abstract syntax tree representing the query.

13. The system of claim 11, wherein retrieving the access rule corresponding to the first table in the query and the user attribute information comprises:

in response to a determination that the first table is identified in the query, retrieving the access rule corresponding to the first table in the query; and upon identifying the first table in the query, retrieving the user attribute information.

14. The system of claim 13, wherein retrieving the access rule corresponding to the first table in the query and the user attribute information comprises:

retrieving data associated with the first table in the query;

in response to a determination that a data access provider is identified in the data associated with the first table in the query; and selecting the data access provider when the data access provider is identified in the data associated with the first table in the query.

15. The system of claim 14, wherein retrieving the access rule corresponding to the first table in the query and the user attribute information comprises:

retrieving a second predicate associated with the additional data access provider associated with the first table.

16. The system of claim 15, wherein the processor is further configured to:

in response to a determination that a second table is associated with the query, identify a data access provider associated with the second table; and retrieve a third predicate associated with the second table.

17. The system of claim 16, wherein the processor is further configured to stack a plurality of predicates associated with the first table and the second table.

18. The system of claim 17, wherein editing the query based on the access rule by modifying a portion of the character string comprises inserting the stacked plurality of predicates associated with the first table and the second table into the character string of the query.

* * * * *